United States Patent
Pasqualino et al.

(10) Patent No.: US 7,450,676 B2
(45) Date of Patent: Nov. 11, 2008

(54) SYNCHRONIZATION OF DATA LINKS IN A MULTIPLE LINK RECEIVER

(75) Inventors: Christopher R. Pasqualino, Glendora, CA (US); Po Ngan Zee, Glendale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/951,280

(22) Filed: Dec. 5, 2007

(65) Prior Publication Data

US 2008/0089456 A1    Apr. 17, 2008

Related U.S. Application Data

(63) Continuation of application No. 10/131,680, filed on Apr. 24, 2002, now Pat. No. 7,308,059.

(60) Provisional application No. 60/354,913, filed on Feb. 6, 2002.

(51) Int. Cl.
H04L 7/00    (2006.01)

(52) U.S. Cl. .................. 375/354; 725/80; 725/133; 725/141

(58) Field of Classification Search ............... 375/354; 725/80, 133, 141
See application file for complete search history.

(56) References Cited

U.S. PATENT DOCUMENTS 4,821,296 A * 4/1989 Cordell .................. 375/374
5,008,636 A * 4/1991 Markinson et al. ............. 331/2
5,278,873 A * 1/1994 Lowrey et al. ............... 375/371
5,648,994 A * 7/1997 Kao ............................ 375/376
5,905,769 A * 5/1999 Lee et al. ..................... 375/376
6,167,077 A * 12/2000 Ducaroir et al. ............. 375/219
6,765,599 B2 * 7/2004 Nagai et al. .................. 345/520
6,954,491 B1 * 10/2005 Kim et al. .................... 375/220
2002/0049879 A1 * 4/2002 Eyer ........................... 710/305
2003/0142240 A1 * 7/2003 Masters ........................ 348/720

OTHER PUBLICATIONS

Digital Display Working Group, Digital Visual Interface DVI Revision 1.0, Apr. 2, 1999.*

* cited by examiner

*Primary Examiner*—Juan A Torres
(74) *Attorney, Agent, or Firm*—Garlick Harrison & Markison; Bruce E. Garlick

(57) ABSTRACT

A dual link receiver terminates, recovers, channel aligns, and link aligns a plurality of primary link channels and a plurality of secondary link channels. The plurality of primary link channels and the plurality of secondary link channels are each received, bit recovered, synchronized, decoded, and channel aligned. Then, the plurality of primary link channels and secondary link channels are link aligned. Link alignment operations first determine a relative misalignment between the plurality of primary link channels and the plurality of secondary link channels. A primary link delay is then applied to the primary link channels and a secondary link delay is then applied to the secondary link channels. A difference between the primary link delay and the secondary link delay is based upon the misalignment between the plurality of primary link channels and the plurality of secondary link channels. An enabling circuit precludes an incorrect blanking period indication.

25 Claims, 15 Drawing Sheets

SYNCHRONIZATION OF DATA LINKS IN A MULTIPLE LINK RECEIVER

CROSS REFERENCES TO RELATED APPLICATIONS

This application is a continuation of U.S. Utility application Ser. No. 10/131,680, filed Apr. 24, 2002, now issued as U.S. Pat. No. 7,308,059, which claims priority to U.S. Provisional Application Ser. No. 60/354,913, filed Feb. 6, 2002, the disclosure of which is incorporated herein by reference.

FIELD OF THE INVENTION

This invention relates generally to digital communications; and more particularly to high-speed serial data communications.

BACKGROUND OF THE INVENTION

Communication technologies that link electronic devices are well known in the art. Some communication technologies link electronic devices via networks. Examples of such networks include wired computer networks, wireless computer networks, wired telephone networks, wireless telephone networks, and satellite communication networks, among other networks. Within such communication networks, a network infrastructure couples electronic devices to one another. Other communication technologies simply link one electronic device to another electronic device. Examples of these types of links include links between computers and their peripheral devices, links between portable data units and computers, links between video devices sources and video monitors, and links between audio sources and audio playback devices, among other examples. With regard to the computer and peripheral device example, communication links couple the computer to its display, the computer to its printer, the computer to its mouse, and the computer to its keyboard, among links.

Many communication link applications require high data rate throughput with minimal or no errors in the data transmitted. Some of these communication links operate in a parallel fashion in which data is carried on a plurality of physical conductors and is clocked in unison. Other of these communication links operates in a serial fashion in which data is carried on a single physical conductor or multiple physical conductors from the first device to the second device in a serial fashion.

One particular type of serial link is a high-speed bit stream serial link. In a high-speed bit stream serial link, data is transmitted from a transmitting device to a receiving device one bit at a time so that, over time, a plurality of bits of data are transferred. An example of such a high-speed bit stream serial link is described generally in the Digital Visual Interface (DVI) standard promulgated by the Digital Display Working Group. The DVI standard sets forth a high-speed bit stream serial link that carries display information from a video source (transmitter) to a video display (receiver), in one operation. The transmitter may be contained in a computer, a cable modem set top box, a satellite receiver set top box, or another source of video content while the receiver is typically contained in a monitor that displays the visual information received via the high data rate bit stream DVI serial link.

The DVI standard describes the operational characteristics of the physical communication path between the transmitter and the receiver. The DVI standard provides for one or two DVI links, each of which includes a plurality of bit stream paths that is synchronized to a clock signal (bit clock). The bit clock and bits streams may operate at frequencies up to 1.65 Gigahertz. At such operating frequencies, the bit streams traveling along the bit stream path(s) are subject to a number of operating conditions that distort the bits as they pass from the transmitter to the receiver. Distortion of bits caused by dispersion along the conductors carrying the bit streams is generally referred to as inter-symbol interference (ISI). ISI distorts the bits such that extraction of the bits from the bit stream is subject to error. Further, the data bit stream(s) is/are often times not aligned fully with the bit clock. Misalignment between a bit stream and the bit clock typically varies over time and is referred to as bit stream jitter. Bit stream jitter often prevents the successful extraction of bits from the bit stream. Whenever bits are not properly extracted by the receiver from the bit stream, data is lost. However, bit stream jitter is common. In many operations, bit stream jitter makes it extraordinarily difficult to successfully meet a bit error rate, e.g., a bit rate of $10^{-9}$ or less.

In dual link DVI applications, six channels are supported, three channels for a primary link and three channels for a secondary link. The data contained on these channels is theoretically synchronized upon its transmission such that it arrives at a receiver in a synchronized form. However, the pair of transmitters that service the dual link DVI application may drift with respect to one another such that transmissions are not synchronized with respect to one another. Further, differences in the respective transmission paths that service the dual link DVI may be such to cause the signals to be further offset from one another when they reach respective servicing receivers. Finally, mismatches in operation of a pair of receivers that service the dual link DVI may also introduce skew into the received data path. Resultantly, data that is received in a serial format and converted to a parallel format for each of the dual links may be skewed in time, causing errors in operation of a servicing receiver.

Therefore, there is a need in the art for a DVI receiver that properly synchronizes incoming data in a multiple link application.

SUMMARY OF THE INVENTION

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1A:
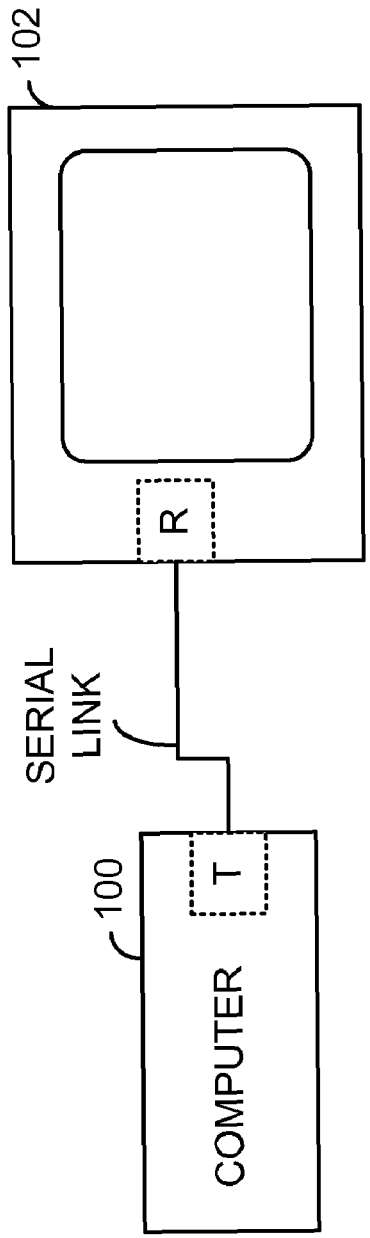
FIG. 1A is a block diagram illustrating a computer and a monitor that intercouple according to the present invention.

FIG. 1A is a block diagram illustrating a computer 100 and a monitor 102 that intercouple according to the present invention. In this embodiment, the computer 100 produces visual information (and audio information in some embodiments) in the form of a high data rate bit stream that it transmits to the monitor 102 via the serial link. As is shown diagrammatically in FIG. 1A, the computer 100 includes a transmitter T while the monitored 102 includes a receiver R. In one embodiment of the serial link, the DVI operating standards are substantially met, except as they may have been modified according to the present invention and as they may be modified by subsequent additions/subtractions for other purposes. In such case, the serial link includes a physical media that carries a plurality of high data rate bit streams and a clock signal (bit clock). The description of the serial link provided herein refers to both single link and dual link operations.

Figure 1B:
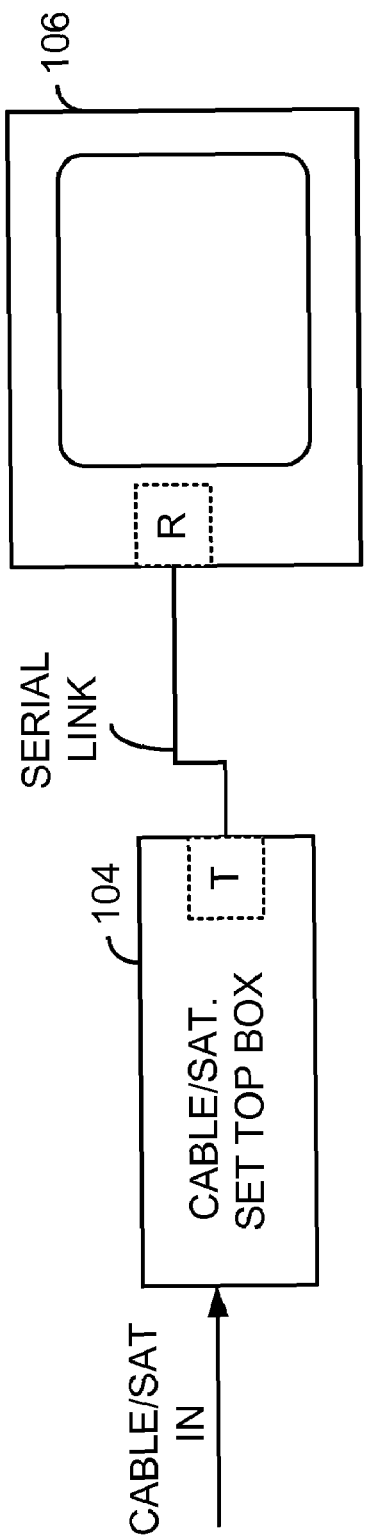
FIG. 1B is a system diagram illustrating a cable/satellite set top box and a video display that intercouple according to the present invention.

FIG. 1B is a system diagram illustrating a cable/satellite set top box and a video display that intercouple according to the present invention. As shown in FIG. 1B, a serial link couples a cable/satellite set top box 104 to a video display 106. The cable/satellite set top box receives input via a cable/satellite input line, processes the cable/satellite input to produce video information, and transmits the video information to the monitor 106 via a serial link that operates according to the present invention. As was the case with the description of FIG. 1A, the serial link of FIG. 1B includes may include a single link DVI or a dual link DVI, both of which are supported by both the cable/satellite set top box 104 and the video display 106.

Figure 2:
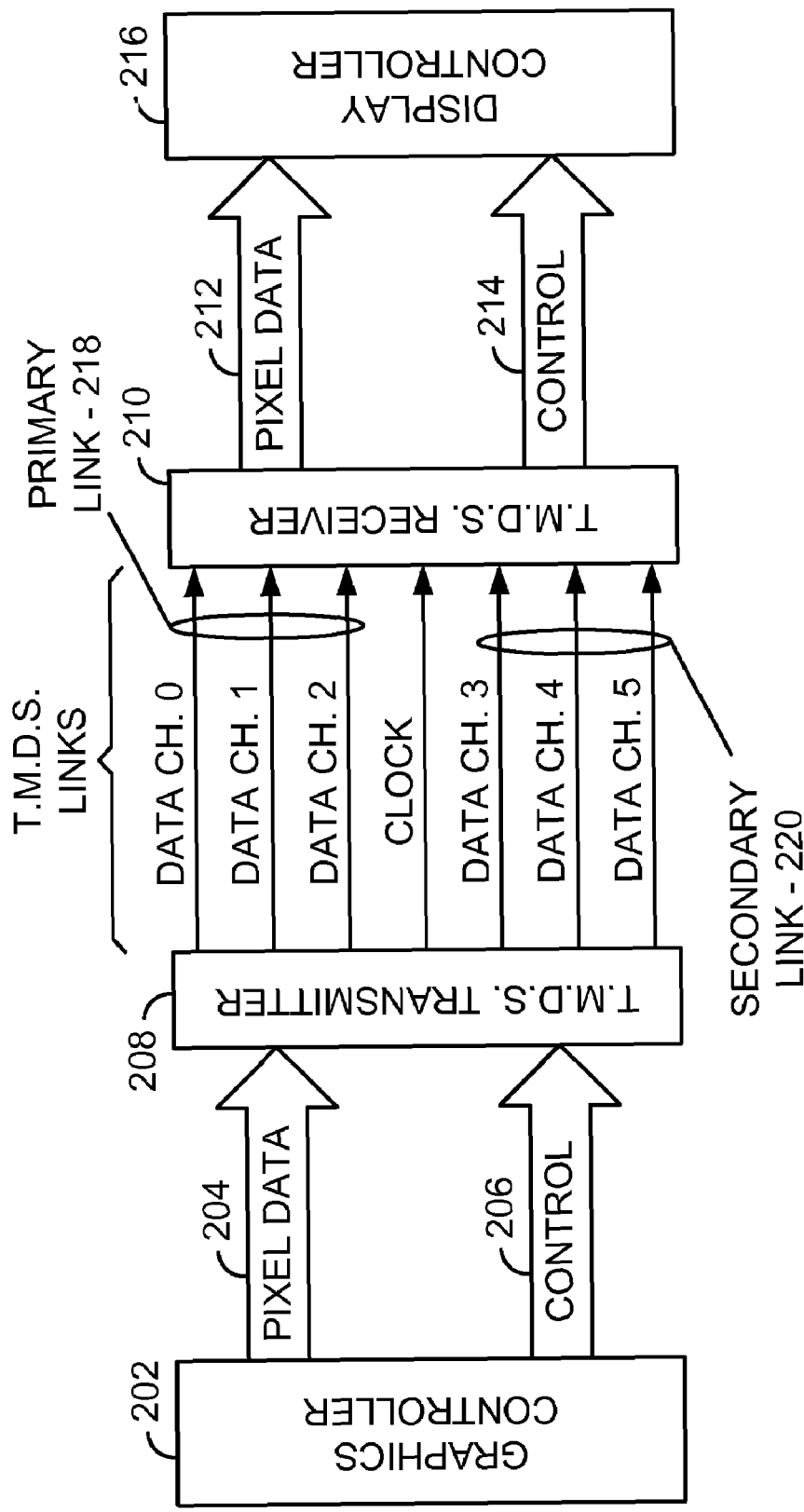
FIG. 2 is a block diagram illustrating a dual link Digital Visual Interface (DVI) that operates according to the present invention.

FIG. 2 is a block diagram illustrating a dual link Digital Visual Interface (DVI) that operates according to the present invention. The dual link DVI couples a graphics controller 202 to a display controller 216. These devices may service the components of FIGS. 1A and 1B, for example. As its output on the transmit side, the graphics controller 202 produces pixel data 204 and control information 206. The pixel data 204 and the control information 206 are received by a Transition Minimized Differential Signaling (T.M.D.S.) transmitter 208 that operates substantially in accordance with the DVI standard. The T.M.D.S. transmitter 208 converts the pixel data 204 and control information 206 into data carried on a plurality of channels and transmits the plurality of channels to a T.M.D.S. receiver 210. A primary link 218 of the dual link DVI includes data channel 0, data channel 1, and data channel 2. A secondary link 220 of the dual link DVI includes data channel 3, data channel 4, and data channel 5. A single/common clock signal (bit clock) services both the primary link 218 and the secondary link 220. In another embodiment, the pixel data 204 also contains audio data.

The T.M.D.S. receiver 210 receives the channels of the primary link 218 and the secondary link 220 and produces pixel data 212 and control information 214 based there upon. The T.M.D.S. receiver 210 provides the pixel data 212 and the control information 214 to a display controller 216. The display controller 216 outputs display data and control to a monitor that creates a visual image based there upon.

According to the present invention, the T.M.D.S. receiver 210 includes a link alignment block(s) that aligns the primary link 218 with the secondary link 220. The link alignment block(s) will be described in detail with particular reference to FIGS. 4-13. According to another aspect of the present invention, the T.M.D.S. receiver 210 includes an enable circuit that prevents any of the channels serviced by a channel from incorrectly indicating the start of a blanking period. The enable circuit will be described with particular reference to FIGS. 14-15.

Figure 3:
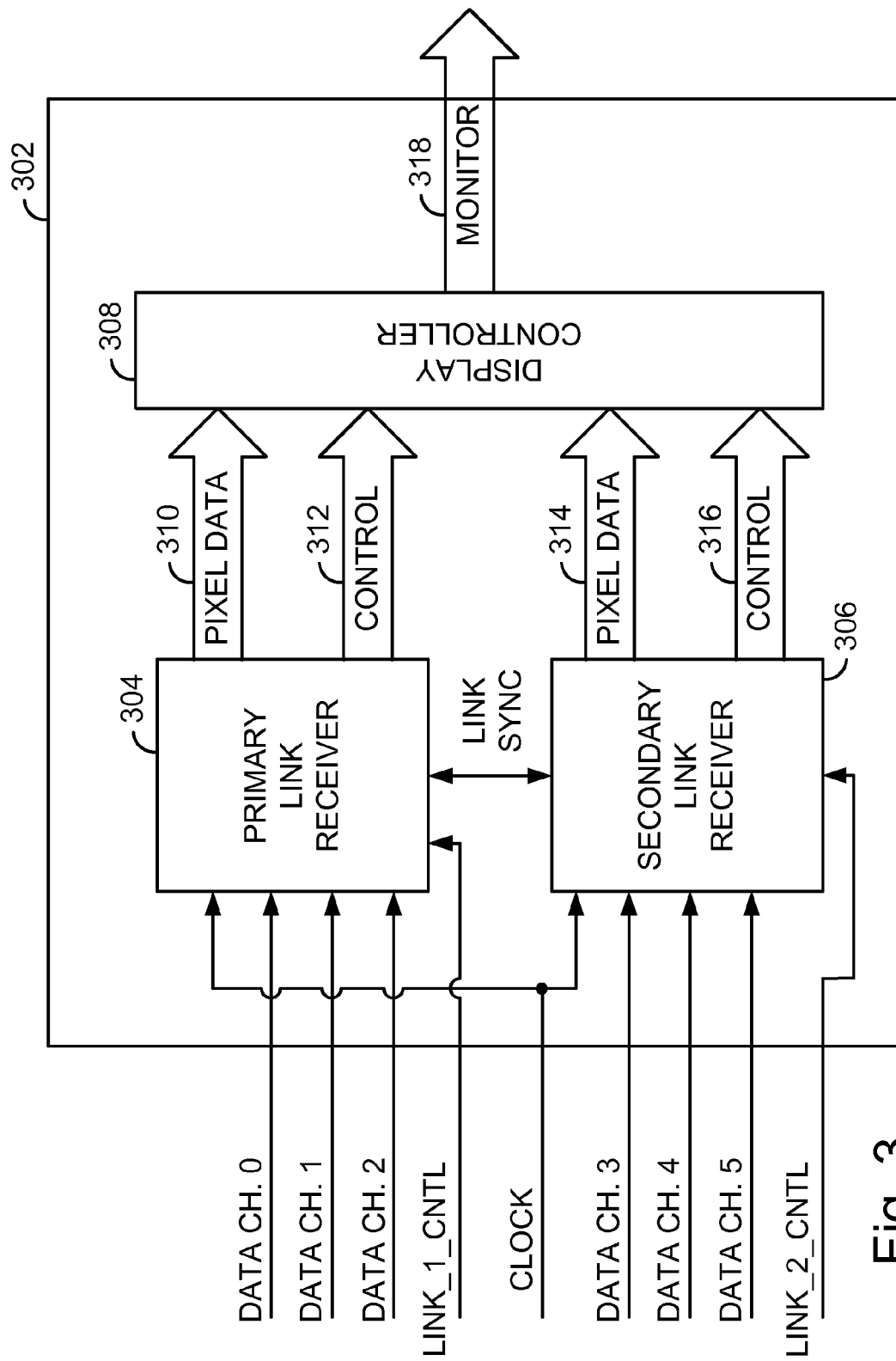
FIG. 3 is a block diagram illustrating the elements of a circuit board (or integrated circuit) that performs dual link DVI receiver operations according to the present invention.

FIG. 3 is a block diagram illustrating the elements of a circuit board 302 (or integrated circuit) that performs dual link DVI receiver operations according to the present invention. Contained on the circuit board 302 are at least three integrated circuits (ICs), including a primary link IC 304, a secondary link IC 306, and a display controller 308. However, each of these components could also be formed on a single integrated circuit in another embodiment.

As shown, the primary link receiver 304 receives channels 0, 1, and 2 and the clock signal. Further, the secondary link receiver 306 receives channels 3, 4, and 5 and the clock signal. The primary link receiver 304 produces pixel data (and audio data in some embodiments) 310 and control data 312 while the secondary link receiver produces pixel data 314 and control data 316. The pixel data 310 and 314 and the control data 312 and 316 are received by the display controller that produces a monitor output 318 that drives a coupled monitor.

According to the present invention, the primary link receiver 304 and the secondary link receiver 306 work in conjunction to output link data that is both channel aligned and link aligned. Thus, both the primary link receiver 304 and the secondary link receiver 306 include channel alignment blocks and link alignment blocks. The structure and operation of these blocks will be described in detail with reference to FIGS. 4-12. An additional embodiment for a receiver having more than two links will be described with reference to FIG. 13.

Figure 4:
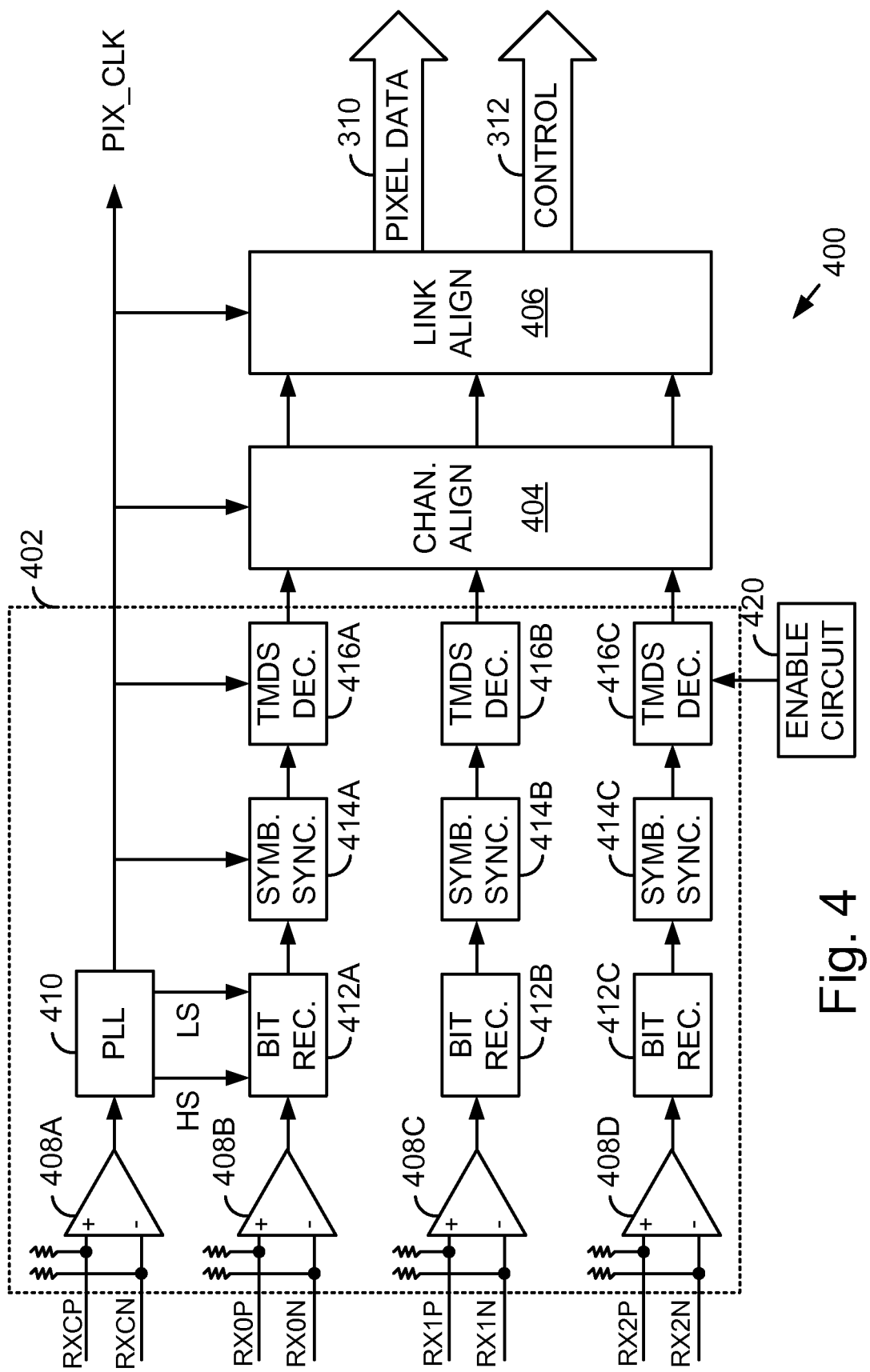
FIG. 4 is a block diagram illustrating a single link DVI receiver constructed according to the present invention.

FIG. 4 is a block diagram illustrating a single link DVI receiver constructed according to the present invention. The single link DVI receiver 400 of FIG. 4 may be either the primary link receiver 304 or the secondary link receiver 306 of FIG. 3. In order to simplify the design of a dual link receiver, the single link DVI receiver 400 of FIG. 4 is directed to serve as the primary link receiver 304 or the secondary receiver 306 via pin settings, software instructions, or other directions.

The single link receiver 400 includes a front end 402 that terminates a plurality of conductors carrying a respective plurality of link channels. In the embodiment of FIG. 4, the single link receiver receives primary link channels, CH_0, CH_1, and CH_2. As is shown, these channels are differential channels carried by differential conductors. The differential channels are referred to in FIG. 4 according to their differential components. In such case, the signals RX0P and RX0N represent CH_0, the signals RX1P and RX1N represent CH_1, and the signals RX2P and RX2N represent CH_2. These differential signals are terminated by termination impedance matched operational amplifiers 408B, 408C, and 408D, respectively. A differential clock signal (RXCP and RXCN) is terminated by termination matched operational amplifier 408A.

The output of the termination matched operational amplifier 408A is received by Phase Locked Loop (PLL) 410 that produces a High Speed (HS) clock and a Low Speed (LS) clock based base thereupon. The LS clock is also referred to as the pixel clock (PIX_CLK). Generally speaking, the HS clock and the LS clock are both used by bit recovery blocks 412A, 412B, and 412C to bit recover the primary link channels CH_0, CH_1, and CH_2, respectively. Further, the PIX_CLK is used by a number of other components within the receiver in conjunction with operations regarding the channel data. One technique for recovering the bits using a deserializer is described in co-pending application Ser. No. 10/144,326, filed May 13, 2002, (co pending). Of course, other bit recovery operations could be employed with the teachings of the present invention as well.

The symbol synchronization blocks 414A, 414B, and 414C perform symbol synchronization operations on the primary link channels CH_0, CH_1, and CH_2, respectively. Further, T.M.D.S. decoder blocks 416A, 416B, and 416C perform T.M.D.S. decoding operations on the primary link channels CH_0, CH_1, and CH_2, respectively. The symbol synchronization operations and T.M.D.S. decoding operations are described within the DVI specification and are not further described herein except as the manner in which they relate to the present invention.

One modification to the T.M.D.S. operations of the present invention are performed by an enable circuit 420 (that will be further described with reference to FIGS. 14 and 15). Generally speaking, the enable circuit 420 precludes the output of a low level data enable signal corresponding to any of the channels, CH_0, CH_1, or CH_2, to indicate the beginning of a blanking period, unless there is a substantial certainty that a blanking period has commenced.

Coupled to the output of the front end 402 is a channel alignment block 404. The channel alignment block 404 receives the plurality of channels from the front end 402 and channel aligns the plurality of channels. Resultantly, the channel alignment block 404 produces a plurality of channel aligned channels. When the receiver 400 operates to service the primary link, the channel alignment block receives a plurality of primary link channels, and produces a plurality of channel aligned primary link channels. When the receiver 400 operates to service the secondary link, the channel alignment block receives a plurality of secondary link channels, and produces a plurality of channel aligned secondary link channels.

The link alignment block 406 couples to the output of the channel alignment block 404 and receives the plurality of channel aligned channels. As its output, the link alignment block 406 produces a plurality of link aligned (and channel aligned) channels. In the embodiment of the present invention illustrated in FIGS. 5, 6, and 12 and whose operation is described with reference to FIGS. 7-11, both the primary link receiver and the secondary link receiver include link alignment blocks. In another embodiment of the present invention, a single link alignment block (not shown) services both the primary link and the secondary link. In either case, a fixed amount of delay is added to the channel paths of one of the links while a variable amount of delay is added to the channel paths of the other link in order to align the links. The variable amount of delay that is added to the channel paths is based upon a misalignment of the links after channel alignment has been performed.

Figure 5:
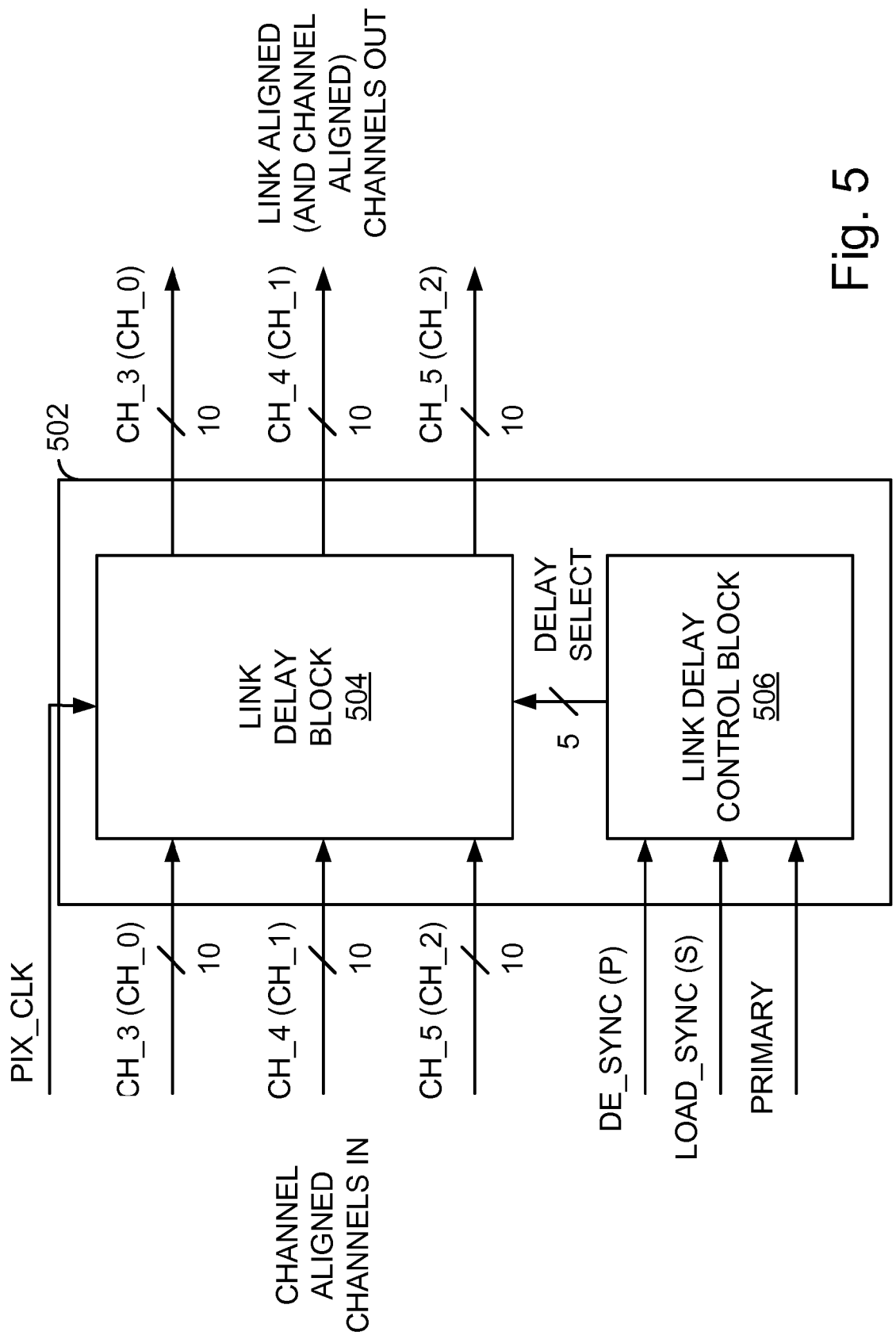
FIG. 5 is a block diagram illustrating a link alignment block constructed according to the present invention that includes a link delay block and a link delay control block.

FIG. 5 is a block diagram illustrating a link alignment block constructed according to the present invention that includes a link delay block 504 and a link delay control block 506. The link delay block 504 receives the plurality of channel aligned channels of a link that it services. When the link alignment block 502 services the primary link, the link alignment block 502 receives the plurality of channel aligned primary link channels, i.e., CH_0, CH_1, and CH_2. Alternately, when the link alignment block 502 services the secondary link, the link alignment block 502 receives the plurality of channel aligned secondary link channels, i.e., CH_0, CH_1, and CH_2. The output of the link alignment block 502 is the plurality of link aligned (and channel aligned) channels that it services, i.e., CH_0, CH_1, and CH_2 when servicing the primary link and CH_3, CH_4, and CH_5 when servicing the secondary link.

The link delay control block 506 receives the DE_SYNC signal, the LOAD_SYNC signal, and the PRIMARY enable signal. When the PRIMARY enable signal is logic high, the link alignment block 502 services the primary link and the link delay control block 506 directs the link delay block 504 to add a fixed amount of delay to each of the channels. In this case, the link delay control block 506 asserts a single fixed value of the DELAY SELECT signal to the link delay control block 504. In response to the assertion of the single fixed value of the DELAY SELECT signal, the link delay block 504 adds a fixed amount of delay to each of the serviced channels. When servicing the primary link, the state of the DE_SYNC and the LOAD_SYNC signals does not affect the operation of the link alignment block 502.

When the PRIMARY enable signal is logic low, the link alignment block 502 services the secondary link. In this configuration, the link delay control block 506 receives the DE_SYNC signal from the primary link receiver and the LOAD_SYNC signal from the secondary link receiver. In the described embodiment, the LOAD_SYNC signal is provided by the channel alignment block of the primary link receiver. Further, the DE_SYNC signal is provided by the channel alignment block of the secondary link receiver. Based upon the relative timing of the DE_SYNC signal and the LOAD_SYNC signal, the link delay control block 506 generates the 5 bit DELAY SELECT signal. The structure of one embodiment of the link delay control block 506 will be described with particular reference to FIG. 12.

For each active data period, the link alignment block 502 applies a set amount of delay to each of the channel aligned channels that it services for each active data cycle. During calibration operations, at the end of the blanking period, this set amount of delay will be determined. Thus, for example, when the link alignment block 502 applies a 7 clock cycle delay, it will delay all three channels that it services by 7 clock cycles. In one particular embodiment of the present invention, when servicing a dual link DVI, 5 clock cycles (pixel clock)

of delay are always added to the primary link while a variable delay of between 3 and 7 clock cycles are added to the secondary link. These operations are described in particular with reference to FIGS. 7-11.

Figure 6:
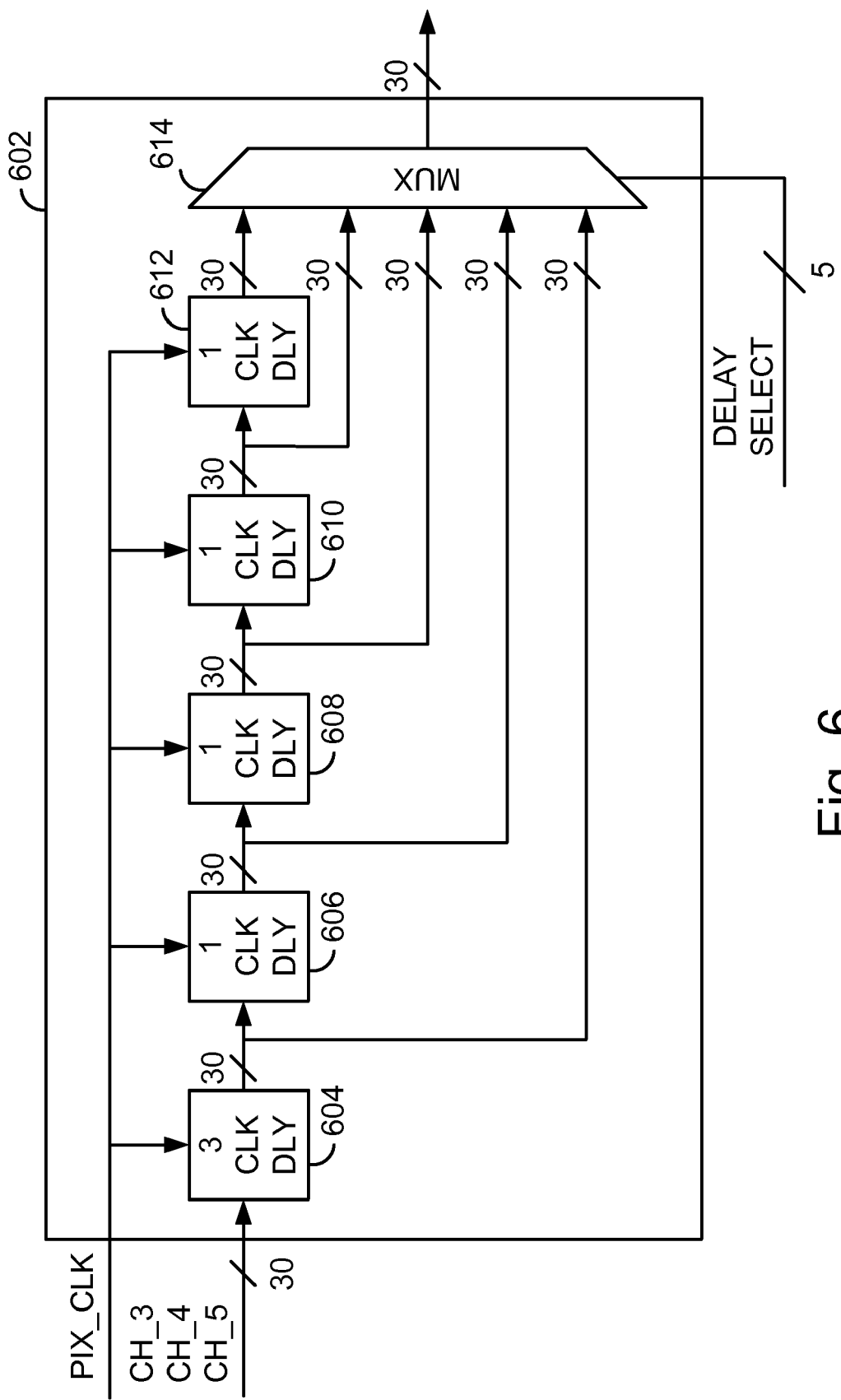
FIG. 6 is a block diagram illustrating a link delay block constructed according to the present invention.

FIG. 6 is a block diagram illustrating a link delay block constructed according to the present invention. The link delay block 602 receives a clock signal (PIX_CLK), channel aligned channels of the serviced link, e.g., the secondary link channels, CH_3, CH_4, and CH_5, and produces link aligned (and channel aligned) channels of the serviced link. The link delay block 602 includes a plurality of delay blocks including a 3 clock delay block 604 and a plurality of 1 clock delay blocks 606, 608, 610, and 612. These delay blocks 604-612 are serially linked to provide a delay path that can produce between 3 and 7 clock cycles of delay to the input channels, CH_3, CH_4, and CH_5. The delay blocks 604-612 and the multiplexer 614 are shown to have a width of 30 bits. However, in another embodiment (not shown), separate components are employed for the data path, each of which has a width of 10 bits.

A multiplexer 614 receives the outputs of each of clock delay blocks 604-612 as its input. The multiplexer 614 receives the DELAY SELECT as its selection input (5 bits). Based upon the value of the DELAY SELECT signal, the multiplexer outputs one of its inputs, i.e., one of the outputs of delay block 604-612. Thus, the link delay block 602 introduces between 3 and 7 clock cycles of delay into the channel stream. As previously described for one embodiment, when the link delay block 602 services the primary link, it introduces 5 clock cycles of delay into the primary link channels. Thus, when the link delay block 602 services the primary link, the DELAY SELECT signal will have a fixed value, e.g., 00100. Further, when the link delay block 602 services the primary link, the delay introduced into the secondary link channels will be between 3 and 7 clock cycles of delay and the DELAY SELECT signal will have a value that varies between 00001 and 10000, depending upon the amount of delay to be introduced. In this embodiment, the DELAY SELECT signal includes only a single 1 bit with the remaining bits being zero.

Figure 7:
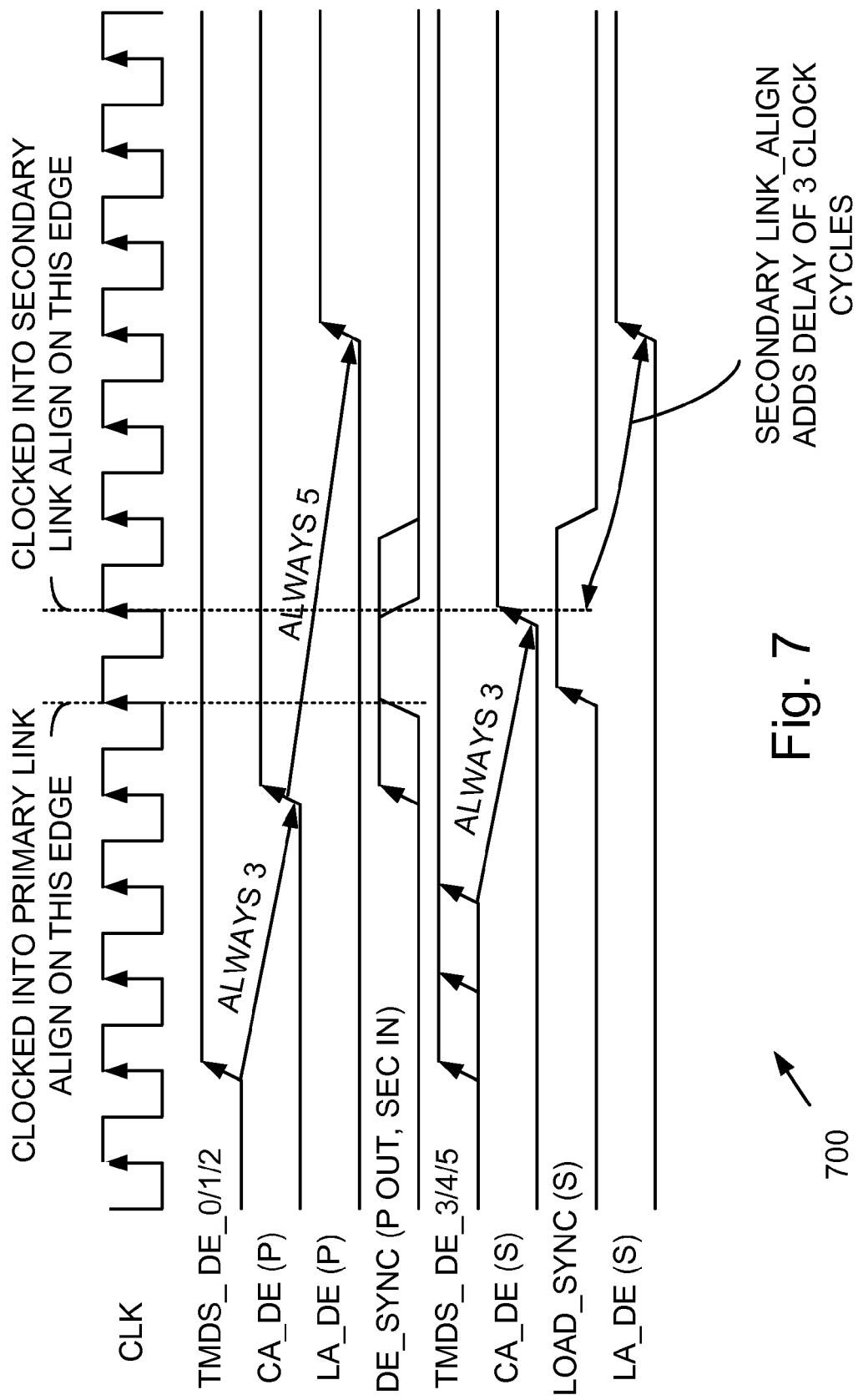
FIG. 7 is signal-timing diagram illustrating a first operational condition of the link alignment block of FIG. 5 according to the present invention.

FIG. 7 is signal-timing diagram illustrating a first operational condition 700 of the link alignment block of FIG. 5 according to the present invention. Link alignment calibration operations are performed at the end of each blanking period. These calibration operations produce a delay level for the secondary link delay block 504 that will be introduced into the secondary link channels for the remainder of the active data period. At the end of the next blanking period, calibration operations will be performed again to determine the delay level to be employed for the next active data period.

FIGS. 7-11 illustrate signals that produce result in corresponding calibration operations that cause the secondary link alignment block to introduce between 3 and 7 clock cycles of delay into the secondary link channels. In each of the operations of FIGS. 7-11, a fixed delay (5 clock cycles) of delay is introduced into the primary link channels by the primary link alignment block. With the signal-timing diagram of FIG. 7, 3 clock cycles of delay are introduced into the secondary link channels by the secondary link alignment block.

The TMDS_DE_0, TMDS_DE_1, and TMDS_2 signals are received from the primary link T.M.D.S. decoder. With the signals of FIG. 7, these signals transition from low to high (to indicate the end of a blanking period) upon the same clock signal. Such is only the case when the channels arrive from the T.M.D.S. decoder in a channel aligned state. When the channels do not arrive in a channel aligned state, the channel alignment block 404 aligns the channels. The primary link signal CA_DE transitions from low to high exactly 3 clock cycles after the last low to high transition of TMDS_DE_0, TMDS_DE_1, and TMDS_DE_2. Further, the primary link signal LA_DE transitions from low to high exactly 5 clock cycles after the primary link signal CA_DE transitions from low to high. Finally, the signal DE_SYNC produced by the primary link receiver transitions from low to high with the transition from low to high of the signal CA_DE. The primary link channels, CH_0, CH_1, and CH_2 are clocked into the primary link alignment block one clock cycle after DE_SYNC signal transitions from low to high.

Referring now to secondary link signals, the secondary link T.M.D.S. decoder produces the TMDS_DE_3, TMDS_DE_4, and the TMDS_DE_5 signals. Note that each of these signals transitions from low to high on a different clock cycle. Such difference in time of the low to high transition of these signals indicates that the secondary link channels are misaligned. The channel alignment block servicing the secondary link will align these secondary link channels to produce the channel aligned secondary link channels.

The secondary signal CA_DE transitions from low to high exactly 3 clock cycles after the last of signals TMDS_DE_3, TMDS_DE_4, and TMDS_DE_5 transitions from low to high. The LOAD_SYNC signal of the secondary receiver transitions from low to high exactly 2 clock cycles after the last of signals TMDS_DE_3, TMDS_DE_4, and TMDS_DE_5 transitions from low to high. The secondary link channels are loaded into the secondary link align block one clock cycle after the transition from low to high of the LOAD_SYNC signal.

The signal DE_SYNC produced by the primary link receiver serves as an input to the secondary link alignment block (as was previously described with reference to FIG. 5). Based upon the timing of the transition from low to high of the DE_SYNC signal in relation to the timing of the transition of the LOAD_SYNC signal from low to high, the calibration operations corresponding to FIG. 7 performed by the link delay control block 506 result in the insertion of 3 clock cycles into the secondary link channels by the link delay block 504.

The signal transitions illustrated in FIG. 7 show that the last of TMDS_DE_3/4/5 transitions from low to high 2 clock cycles after the last of TMDS_DE_0/1/2 transitions from low to high. Thus, the secondary link channels lag the primary link channels by 2 clock cycles. Because the primary link alignment block introduces 5 clock cycles of delay into the primary link channels, in order to match this delay, the secondary link alignment block must introduce 3 clock cycles of delay into the secondary link channels in order to align the links. Resultantly, with the links aligned, the signal LA_DE (secondary) transitions from low to high on the same clock cycles as the signal LA_DE (primary).

Figure 8:
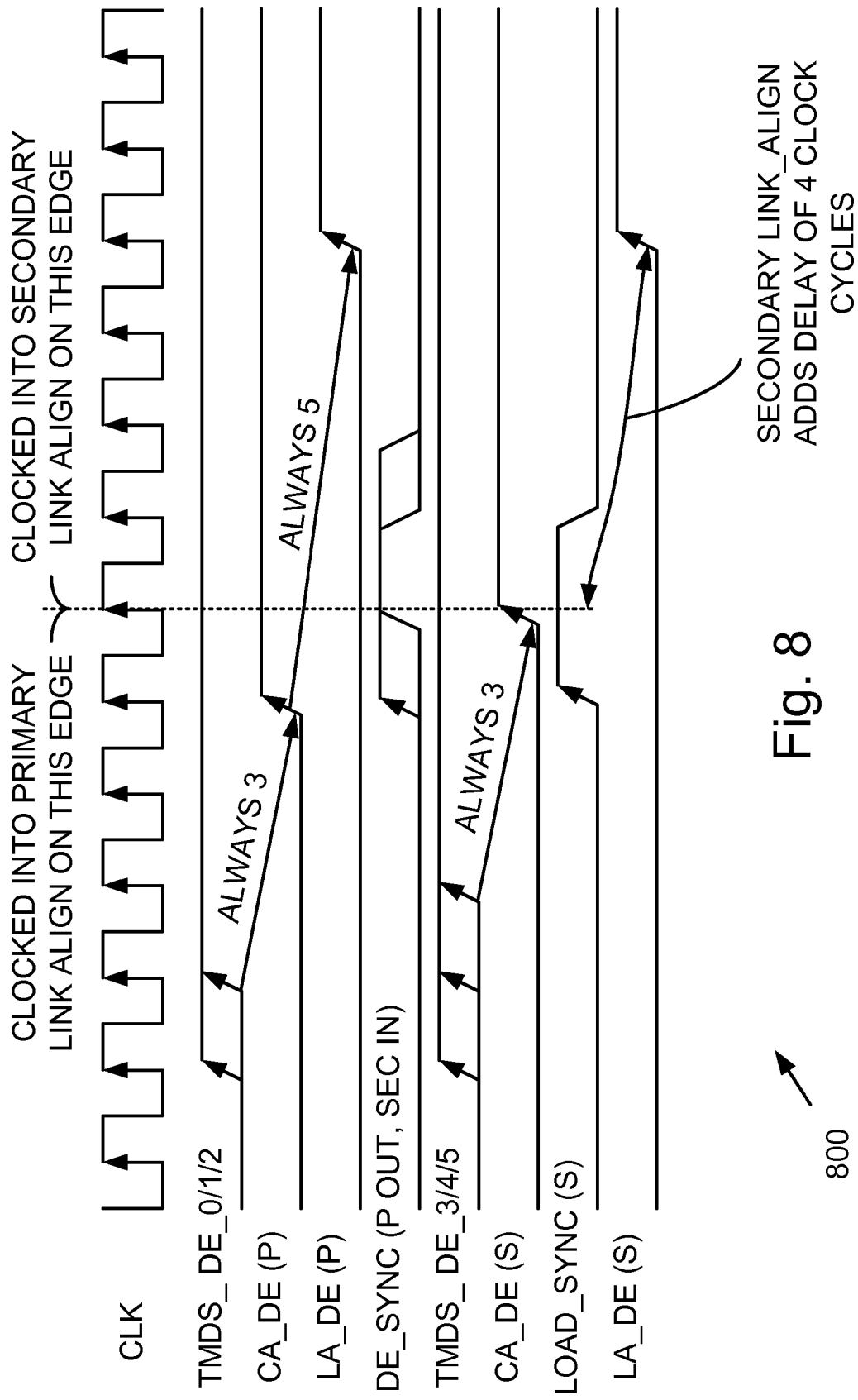
FIG. 8 is signal-timing diagram illustrating a second operational condition of the link alignment block of FIG. 5 according to the present invention.

FIG. 8 is signal-timing diagram illustrating a second operational condition 800 of the link alignment block of FIG. 5 according to the present invention. The signal transitions illustrated in FIG. 8 show that the last of TMDS_DE_3/4/5 transitions from low to high 1 clock cycle after the last of TMDS_DE_0/1/2 transitions from low to high. Thus, the secondary link channels lag the primary link channels by 1 clock cycle. Because the primary link alignment block introduces 5 clock cycles of delay into the primary link channels, in order to match this delay, the secondary link alignment block introduces 4 clock cycles of delay into the secondary link channels.

Figure 9:
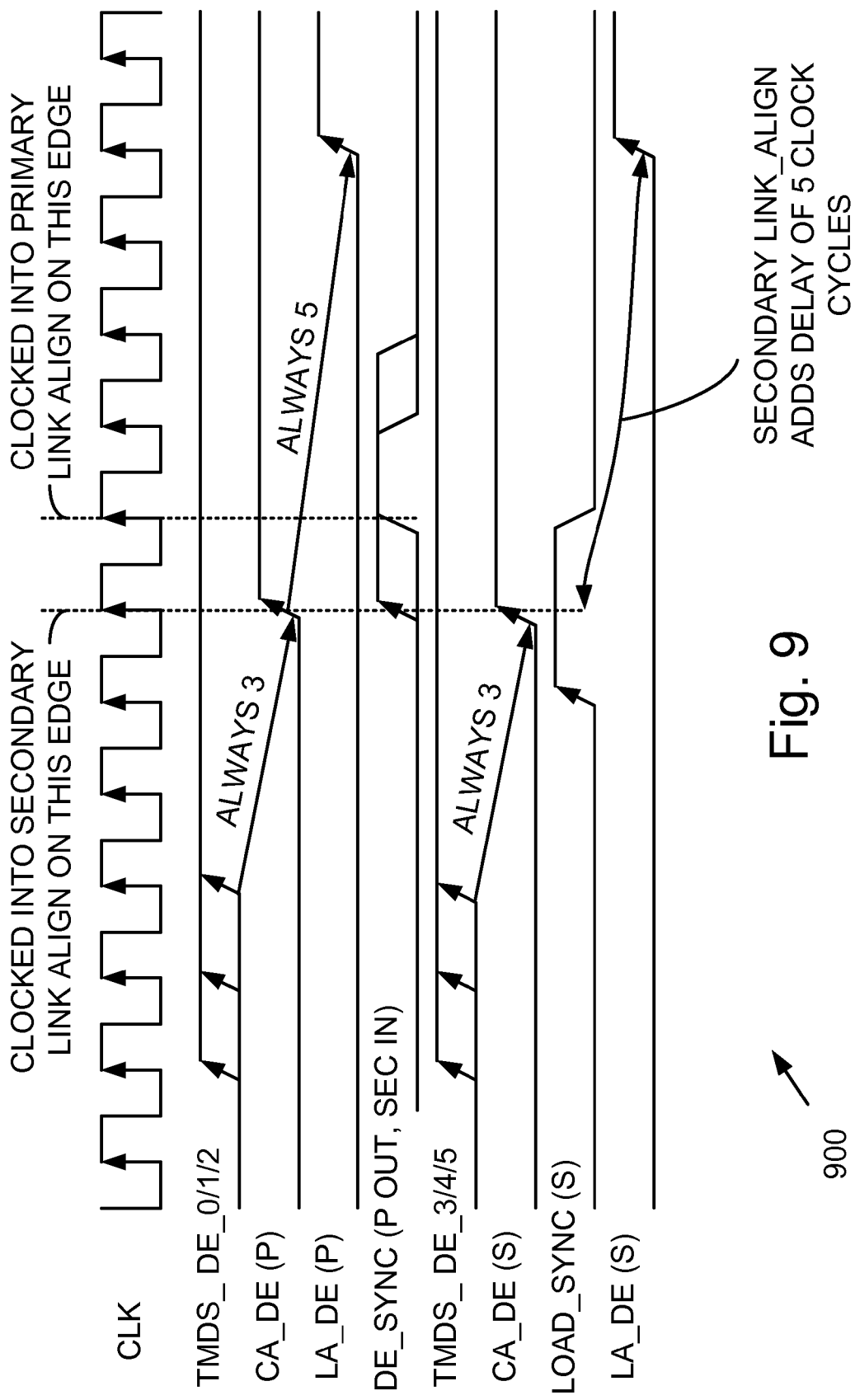
FIG. 9 is signal-timing diagram illustrating a third operational condition of the link alignment block of FIG. 5 according to the present invention.

FIG. 9 is signal-timing diagram illustrating a third operational condition 900 of the link alignment block of FIG. 5 according to the present invention. The signal transitions illustrated in FIG. 9 show that the last of TMDS_DE_3/4/5 transitions from low to high on the same clock cycle as the last of TMDS_DE_0/1/2 transitions from low to high. Thus, the secondary link channels align with the primary link channels. Because the primary link alignment block introduces 5 clock cycles of delay into the primary link channels, in order to match this delay, the secondary link alignment block introduces 5 clock cycles of delay into the secondary link channels.

Figure 10:
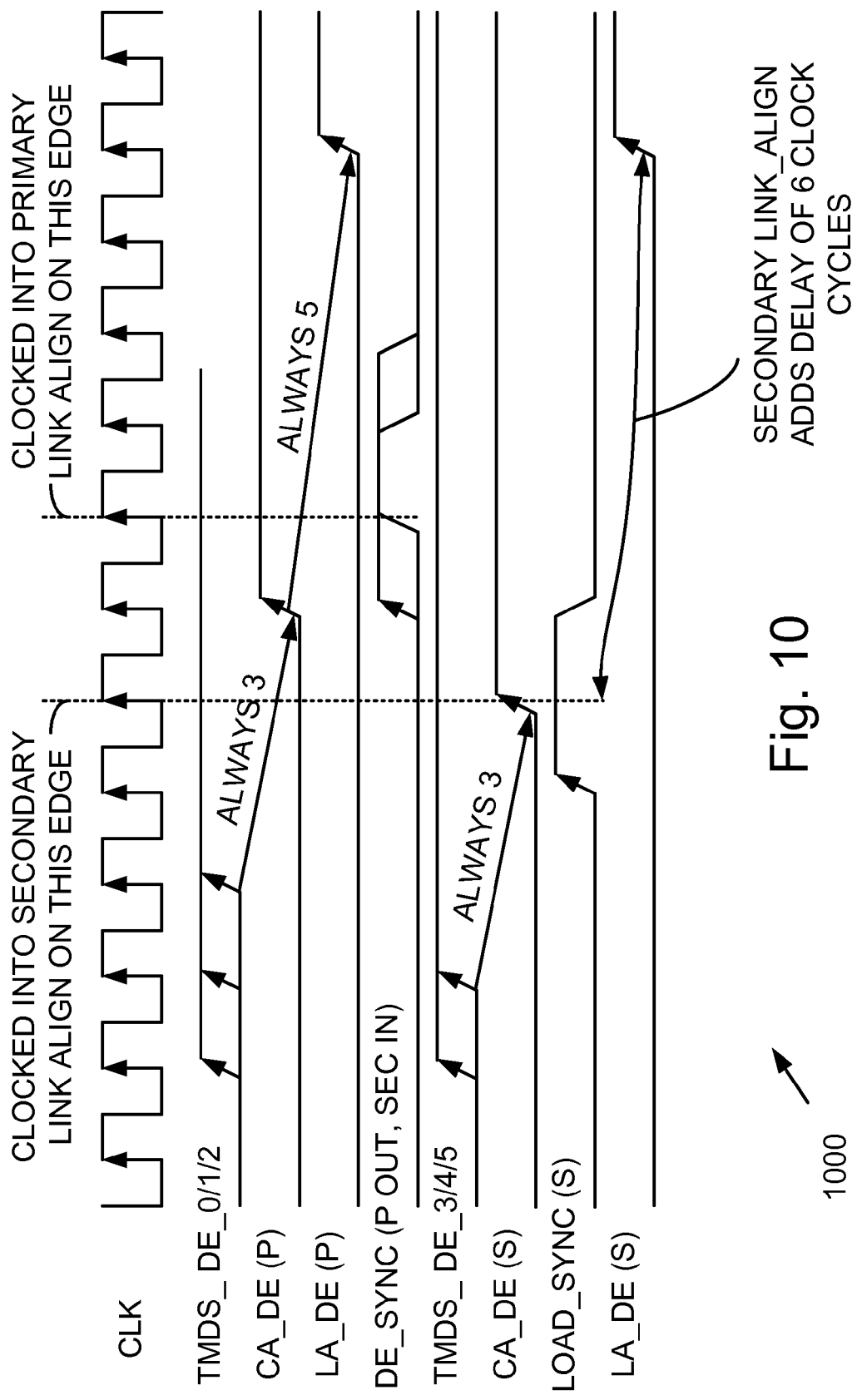
FIG. 10 is signal-timing diagram illustrating a fourth operational condition of the link alignment block of FIG. 5 according to the present invention.

FIG. 10 is signal-timing diagram illustrating a fourth operational condition 1000 of the link alignment block of FIG. 5 according to the present invention. The signal transitions illustrated in FIG. 10 show that the last of TMDS_DE_3/4/5 transitions from low to high 1 clock cycle before the last of TMDS_DE_0/1/2 transitions from low to high. Thus, the secondary link channels lead the primary link channels by 1 clock cycle. Because the primary link alignment block introduces 5 clock cycles of delay into the primary link channels, in order to match this delay, the secondary link alignment block introduces 6 clock cycles of delay into the secondary link channels.

Figure 11:
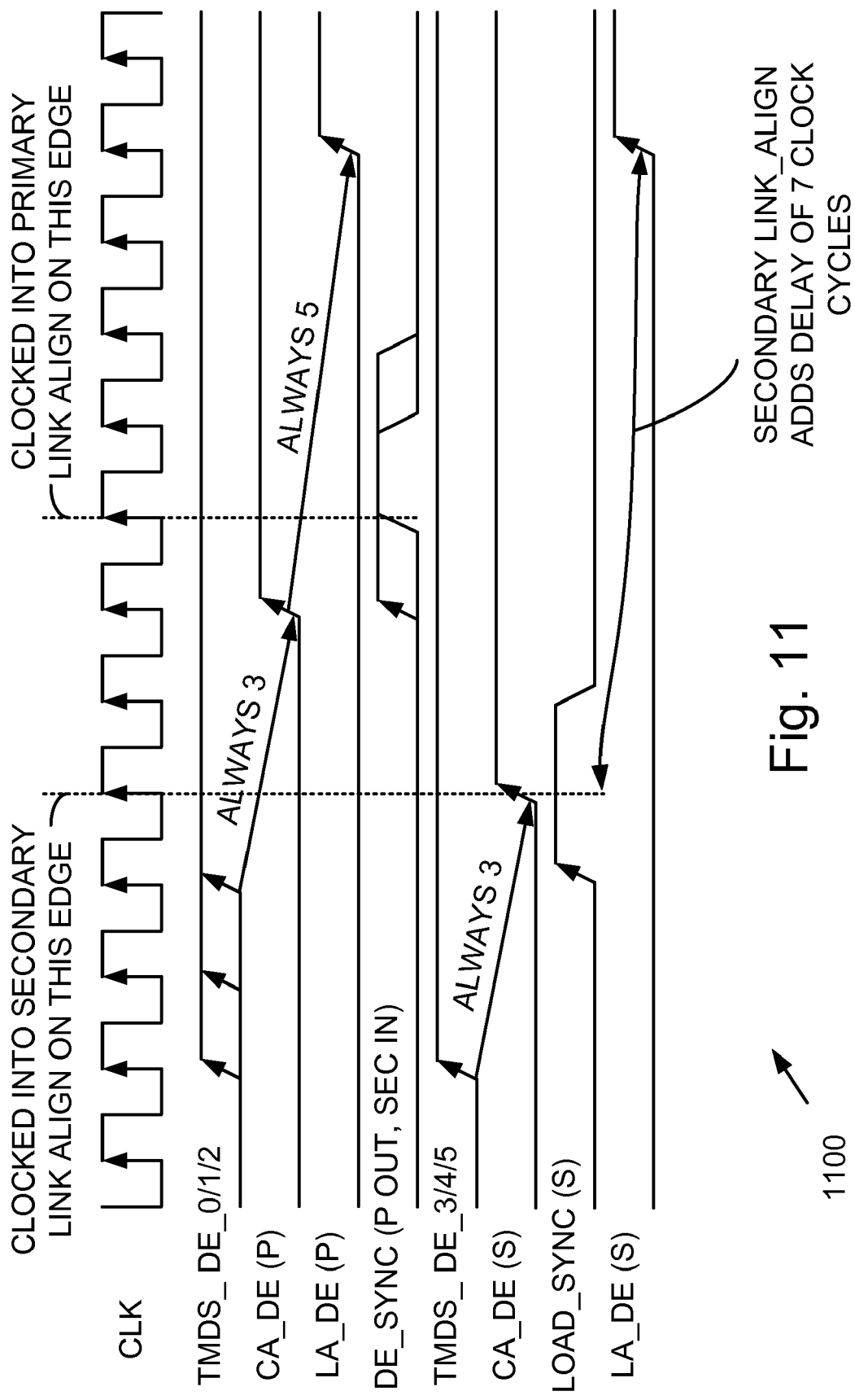
FIG. 11 is signal-timing diagram illustrating a fifth operational condition of the link alignment block of FIG. 5 according to the present invention.

FIG. 11 is signal-timing diagram illustrating a fifth operational condition 1100 of the link alignment block of FIG. 5 according to the present invention. The signal transitions illustrated in FIG. 11 show that the last of TMDS_DE_3/4/5 transitions from low to high 2 clock cycles before the last of TMDS_DE_0/1/2 transitions from low to high. Thus, the secondary link channels lead the primary link channels by 2 clock cycles. Because the primary link alignment block introduces 5 clock cycles of delay into the primary link channels, in order to match this delay, the secondary link alignment block introduces 7 clock cycles of delay into the secondary link channels.

Figure 12:
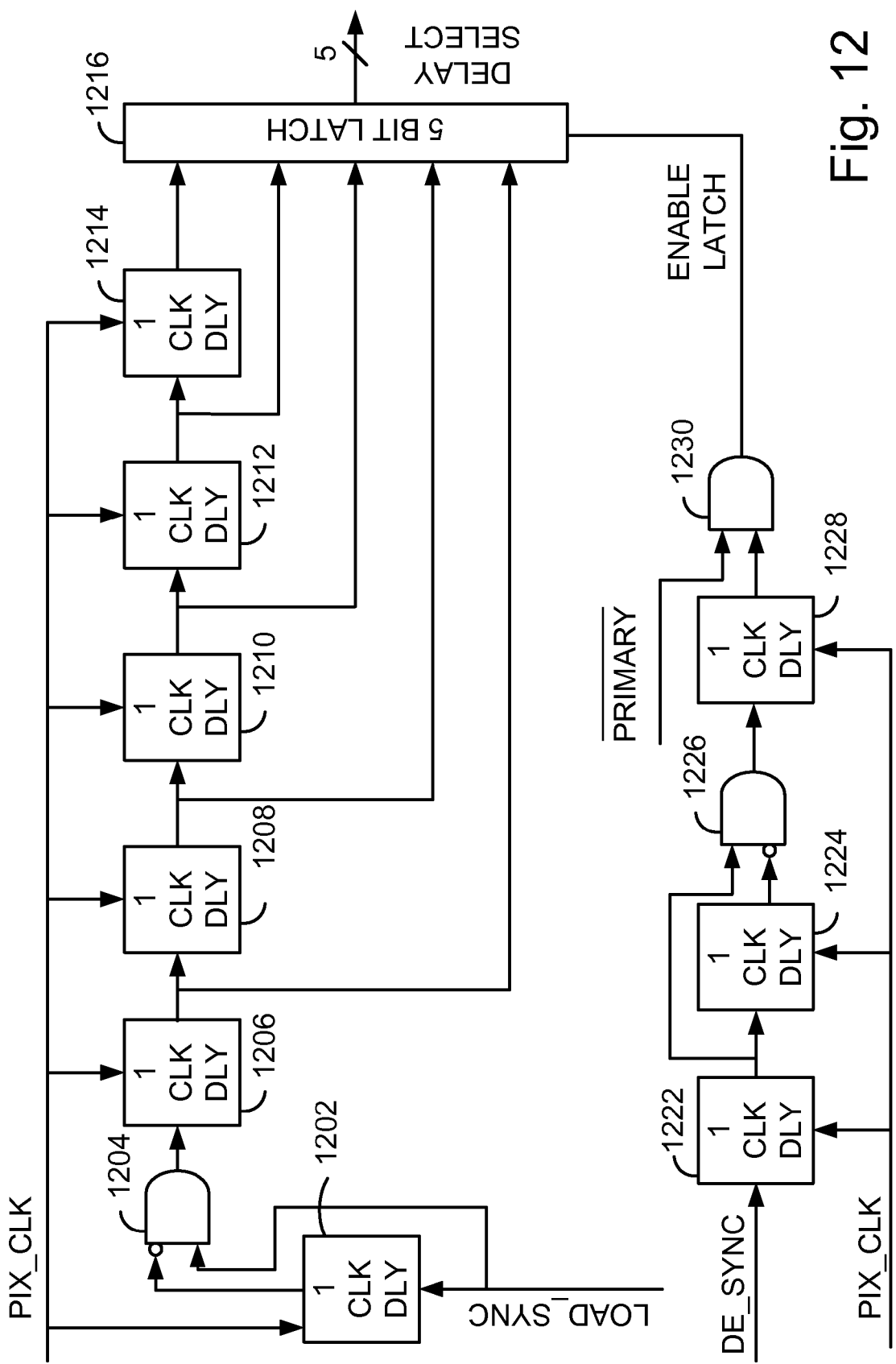
FIG. 12 is a block diagram illustrating a link delay control block constructed according to the present invention.

FIG. 12 is a block diagram illustrating a link delay control block constructed according to the present invention. The link delay control block includes a 1 clock delay block 1202 that receives the LOAD_SYNC signal. A 1 clock cycle delayed and inverted representation of the LOAD_SYNC signal and the LOAD_SYNC signal serve as input to AND gate 1204. 1 clock delay blocks 1206, 1208, 1210, 1212, and 1214 are sequentially coupled to receive the output of the AND gate 1204. Thus, when the LOAD_SYNC signal transitions from low to high, a logical high signal will propagate along the outputs of the sequentially coupled 1 clock delay blocks 1206, 1208, 1210, 1212, and 1214 such that only one of the 1 clock delay blocks 1206-1214 will be logic high during any clock cycle. The outputs of the 1 clock delay blocks 1206, 1208, 1210, 1212, and 1214 serve as inputs to the 5 bit latch 1216.

A 1 clock delay block 1222 receives the DE_SYNC signal. An output of the 1 clock delay block 1222 is received by 1 clock delay block 1224. The output of the 1 clock delay block 1224 and an inverted output of 1 clock delay block 1222 are received by AND gate 1226. 1 clock delay block 1228 receives as its input the output of AND gate 1226. The output of 1 clock delay block 1228 and an inverted version of the PRIMARY signal are received by AND gate 1230. The output of AND gate 1230 serves as the ENABLE LATCH signal of the 5 bit latch. The output of the 5 bit latch 1216 is the five bit DELAY SELECT signal having only a single bit high. The high bit of the DELAY SELECT signal corresponds to the delay introduced by the link delay control block 504. When the inverted version of the PRIMARY signal is logic low, i.e., the device services the primary link, the ENABLE LATCH signal remains logic low. Resultantly, the 5 bit latch 1216 produces a signal corresponding to a 5 cycle delay.

Figure 13:
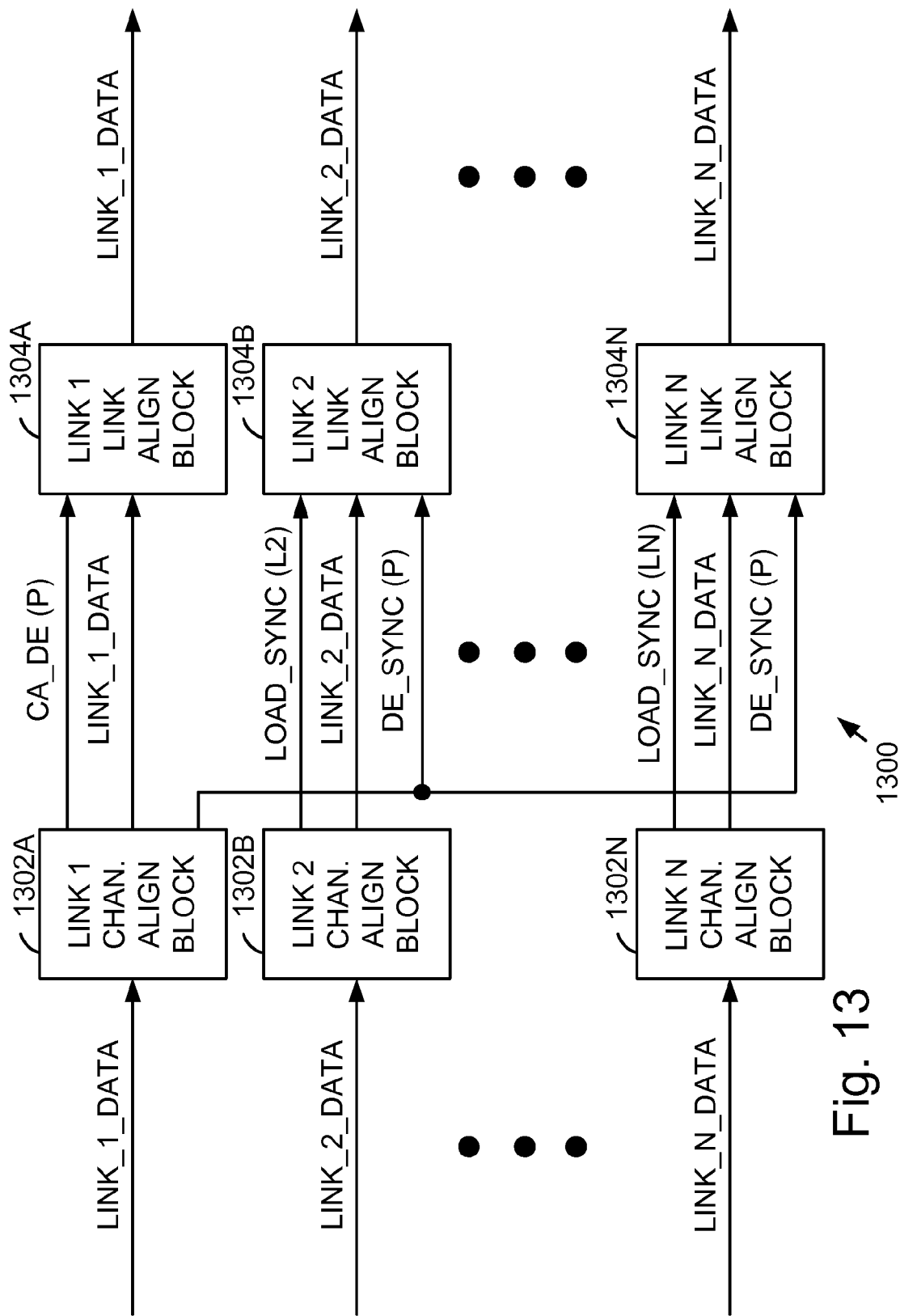
FIG. 13 is a block diagram illustrating an N link receiver that operates according to the present invention to align the N links.

FIG. 13 is a block diagram illustrating an N link receiver that operates according to the present invention to align the N links. The N link receiver 1300 includes channel alignment blocks 1302A, 1302B, . . . , 1302N which service links 1, 2, . . . , N, respectively. Further, the N link receiver 1300 includes link alignment blocks 1304A, 1304B, . . . , 1304N which service links 1, 2, . . . , N, respectively.

The principles described previously may be easily extended to the structure of FIG. 13 by considering each of links 2 through N to be secondary links and link 1 to be a primary link. Thus, each of link alignment blocks 2, . . . , N receives as input a DE_SYNC signal produced by the primary channel alignment block 1302A (or other link 1 device). Based upon the alignment of the channel aligned channels of the secondary links with respect to the primary links, the secondary link alignment blocks 1304B-1304N add appropriate amounts of delay into the respective links.

Figure 14:
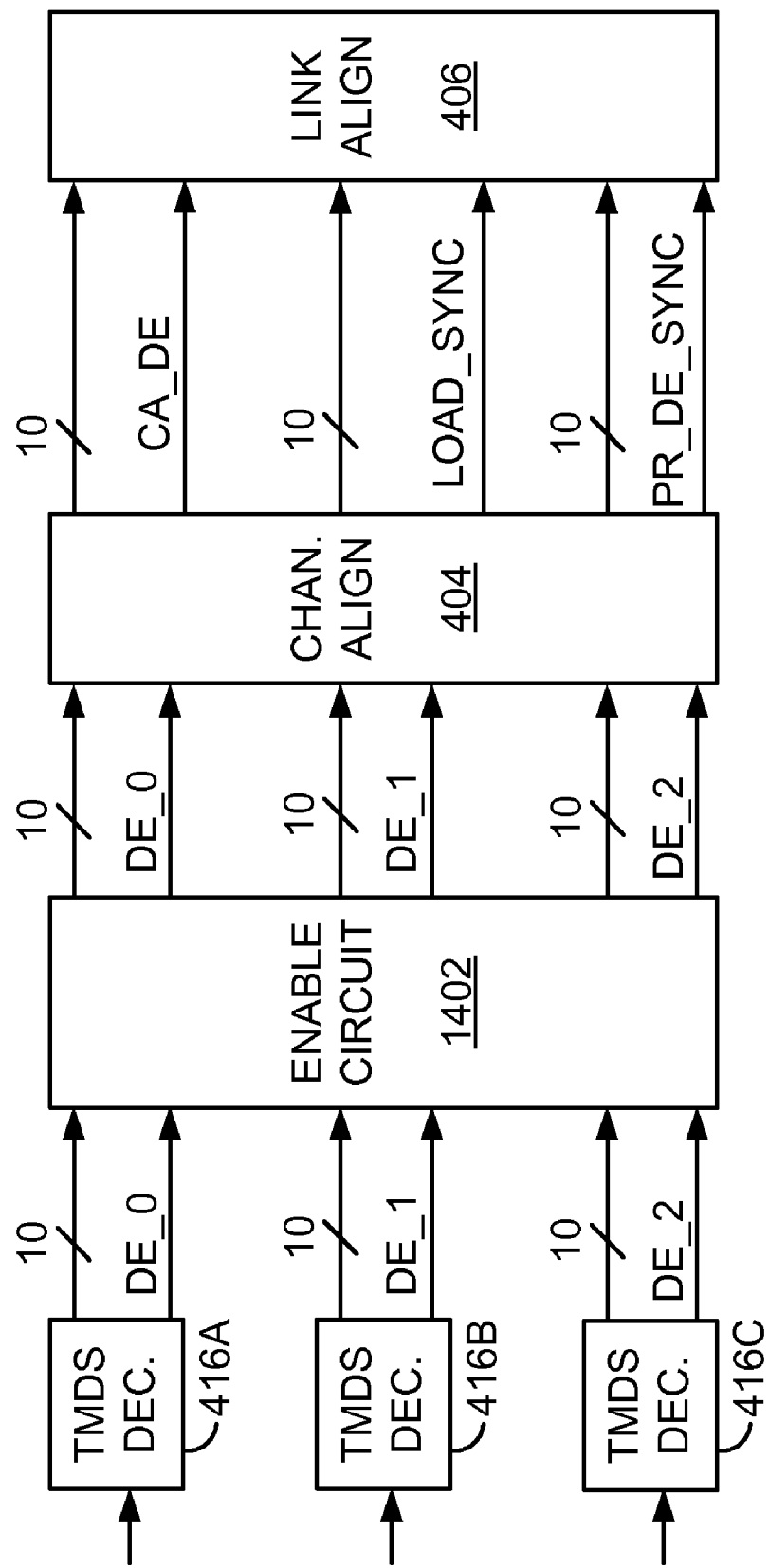
FIG. 14 is a block diagram illustrating a portion of a DVI receiver and the manner in which an enabling circuit constructed according to the present invention may be incorporated therein.

FIG. 14 is a block diagram illustrating a portion of a DVI receiver and the manner in which an enabling circuit constructed according to the present invention may be incorporated therein. When the DVI receiver services a video display, the output of the receiver is used to drive the video display. If the DVI receiver incorrectly indicates the beginning of a blanking period by the high to low transition of one of the DE_0, DE_1, or DE_2 signals, a blanking period would be incorrectly initiated. Thus, the enable circuit 1402 prevents the DE_0, DE_1, and DE_2 signals from incorrectly transitioning from high to low in the middle of a data cycle.

Figure 15:
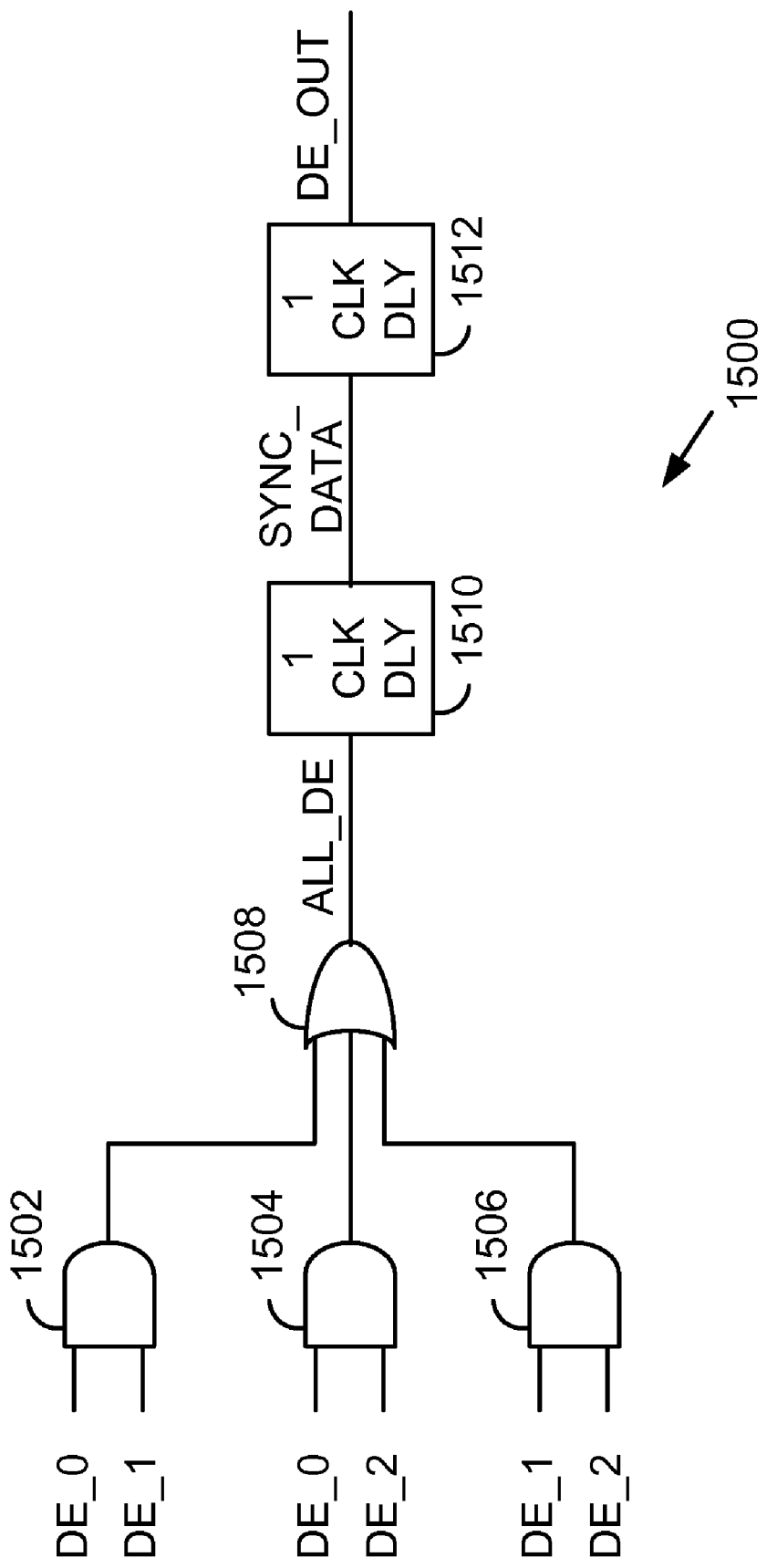
FIG. 15 is a schematic diagram illustrating a portion of the enable circuit of FIG. 14.

FIG. 15 is a schematic diagram illustrating a portion of the enable circuit 1500 of FIG. 14. The enable circuit includes AND gates 1502, 1504, and 1506. AND gate 1502 receives as its inputs DE_0 and DE_1. AND gate 1504 receives as its inputs DE_0 and DE_2. AND gate 1506 receives as its inputs DE_1 and DE_2. Thus, one (or more) of AND gates 1502, 1504, or 1506 will produce a logic 1 when two (or more) of DE_0, DE_1, and DE_2 are logic high. The outputs of AND gates 1502, 1504, and 1506 are received by OR gate 1508 that produces the signal ALL_DE. Only if two out of three of the signals DE_0, DE_1, and DE_2 are logic low will the signal ALL_DE be logic low. Otherwise, the signal ALL_DE will be logic high, i.e., two out of DE_0, DE_1, and DE_2 are logic high.

A 1 clock delay block 1510 receives as its input the signal ALL_DE and produces the signal SYNC_DATA as its output. A 1 clock delay block 1512 receives the signal SYNC_DATA and produces as its output the signal DE_OUT, which is used by the DVI receiver to perform its other operations, including initiating blanking period operations.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims.

The invention claimed is:

1. A dual link receiver that terminates a primary link having a plurality of primary link channels and that terminates a secondary link having a plurality of secondary link channels, the receiver comprising:
 a primary link receiver that receives and channel aligns the plurality of primary Link channels of the primary link;
 a secondary link receiver that receives and channel aligns the plurality of secondary link channels of the secondary link; and
 a link alignment block coupled to the primary link receiver and to the secondary link receiver that aligns the plurality of secondary link channels with the plurality of primary link channels by introducing a fixed amount of delay into the plurality of primary link channels and by introducing a variable amount of delay into the plurality of secondary link channels.

2. The receiver of claim 1, wherein:
in receiving the plurality of primary link channels, the primary link receiver further synchronizes and decodes the plurality of primary link channels; and
in receiving the plurality of secondary link channels, the secondary link receiver further synchronizes and decodes the plurality of secondary link channels.

3. The receiver of claim 1, wherein the variable amount of delay is based upon a relative alignment between the plurality of channel aligned secondary link channels and the plurality of channel aligned primary link channels.

4. The receiver of claim 1, wherein the variable amount of delay varies over time based upon alignment differences over time between the plurality of channel aligned secondary link channels and the plurality of channel aligned primary link channels.

5. The receiver of claim 1, wherein the link alignment block comprises:
a primary link alignment block that receives the plurality of channel aligned primary link channels; and
a secondary link alignment block that receives the plurality of channel aligned secondary link channels.

6. The receiver of claim 5, wherein:
the primary link alignment block introduces the fixed amount of delay into the plurality of channel aligned primary link channels; and
the secondary link alignment block introduces the variable amount of delay into the plurality of channel aligned secondary link channels.

7. The receiver of claim 1, wherein:
the plurality of primary link channels comprises three bit stream channels; and
the plurality of secondary link channels comprises three bit stream channels.

8. The receiver of claim 1, wherein the receiver operates consistently with one or more versions of the Digital Visual Interface specification.

9. The receiver of claim 1, wherein the primary link receiver and the secondary link receiver are constructed on a single integrated circuit.

10. The receiver of claim 1, wherein the dual link receiver services at least one of video information, audio information, and control information.

11. A method for receiving and aligning a dual link that includes a primary link having a plurality of primary link channels and a secondary link having a plurality of secondary link channels, the method comprising:
receiving and channel aligning the plurality of primary link channels of the primary link;
receiving and channel aligning the plurality of secondary link channels of the Secondary link; and
aligning the plurality of channel aligned secondary link channels with the plurality of channel aligned primary link channels by introducing a fixed amount of delay into the plurality of channel aligned primary link channels and by introducing a variable amount of delay into the plurality of channel aligned secondary link channels.

12. The method of claim 11, wherein:
receiving the plurality of primary link channels includes synchronizing and decoding the plurality of primary link channels; and receiving the plurality of secondary link channels includes synchronizing and decoding the plurality of secondary link channels.

13. The method of claim 11, wherein the variable amount of delay is based upon a relative alignment between the plurality of channel aligned secondary link channels and the plurality of channel aligned primary link channels.

14. The method of claim 11, wherein the variable amount of delay varies over time based upon alignment differences over time between the plurality of channel aligned secondary link channels and the plurality of channel aligned primary link channels.

15. The method of claim 11, wherein:
the plurality of primary link channels comprises three bit stream channels; and
the plurality of secondary link channels comprises three bit stream channels.

16. The method of claim 11, further comprising operating consistently with one or more versions of the Digital Visual Interface specification.

17. The method of claim 11, wherein the dual link carries at least one of video information, audio information, and control information.

18. A multiple link receiver that terminates a primary link having a plurality of primary link channels and that terminates a plurality of secondary links each having a plurality of secondary link channels, the receiver comprising:
a primary link receiver that receives and channel aligns the plurality of primary link channels of the primary link;
a plurality of secondary link receivers, each that receives and channel aligns a corresponding plurality of secondary link channels of a corresponding secondary link; and
a link alignment block coupled to the primary link receiver and to the plurality of secondary link receivers that aligns the plurality of secondary link channels of the plurality of secondary links with the plurality of primary link channels by introducing a fixed amount of delay into the plurality of primary link channels and by introducing respective variable amounts of delay into the plurality of secondary link channels of the plurality of secondary links.

19. The multiple link receiver of claim 18, wherein the variable amounts of delay are based upon relative alignments between the plurality of channel aligned secondary link channels of the plurality of secondary links and the plurality of channel aligned primary link channels.

20. The multiple link receiver of claim 18, wherein the variable amounts of delay vary over time based upon alignment differences over time between the plurality of channel aligned secondary link channels of the plurality of secondary links and the plurality of channel aligned primary link channels.

21. The multiple link receiver of claim 18, wherein the link alignment block comprises:
a primary link alignment block that receives the plurality of channel aligned primary link channels; and
a plurality of secondary link alignment blocks, each that receives a corresponding plurality of channel aligned secondary link channels of the plurality of secondary links.

22. The multiple link receiver of claim 21, wherein:
the primary link alignment block introduces the fixed amount of delay into the plurality of channel aligned primary link channels; and the plurality of secondary link alignment blocks introduce respective variable amounts of delay into the plurality of channel aligned secondary link channels of the plurality of secondary links.

23. The multiple link receiver of claim 21, wherein:

the plurality of primary link channels comprises three bit stream channels; and at least some of the plurality of secondary link channels comprise three bit stream channels.

24. The multiple link receiver of claim 18, wherein the receiver operates consistently with one or more versions of the Digital Visual Interface specification.

25. The multiple link receiver of claim 18, wherein the multiple link receiver services at least one of video information, audio information, and control information.

* * * * *

UNITED STATES PATENT AND TRADEMARK OFFICE
CERTIFICATE OF CORRECTION

PATENT NO. : 7,450,676 B2 Page 1 of 1
APPLICATION NO. : 11/951280
DATED : November 11, 2008
INVENTOR(S) : Christopher R. Paqualino et al.

It is certified that error appears in the above-identified patent and that said Letters Patent is hereby corrected as shown below:

Column 10, line 62, in Claim 1: the first written "link" should be lowercase.

Column 11, line 57, in Claim 11: "secondary" should be lowercase.

Signed and Sealed this

Twenty-sixth Day of May, 2009

JOHN DOLL
*Acting Director of the United States Patent and Trademark Office*